Figure 7:
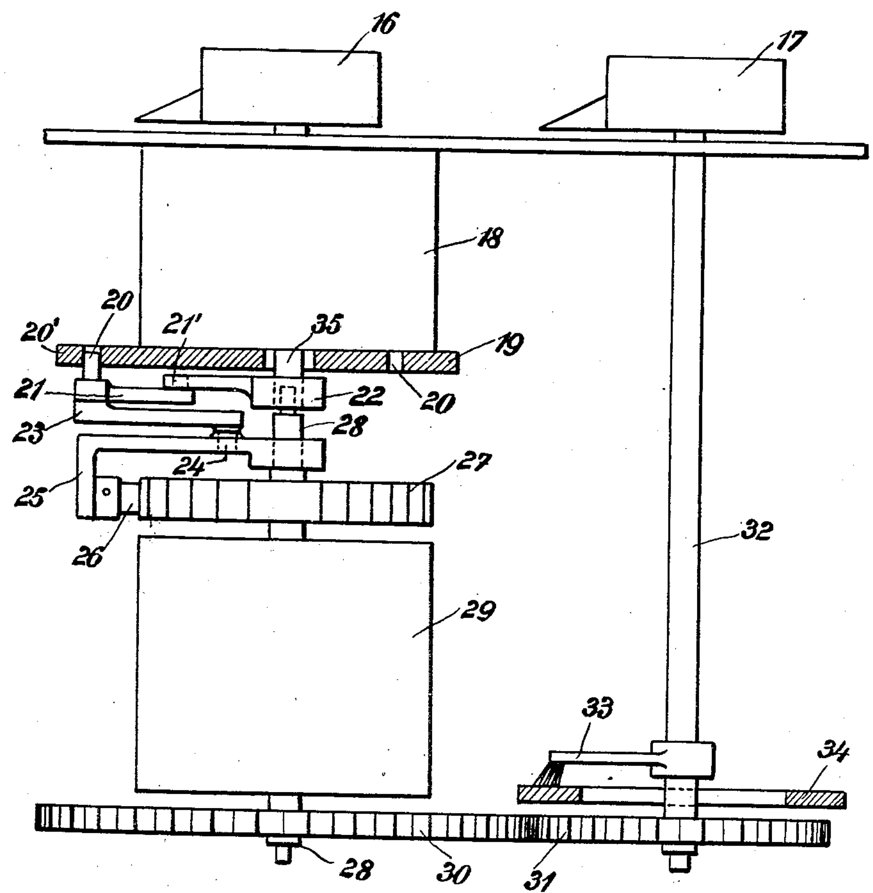

May 18, 1943
K. HEFEL
2,319,322
CONTROL MEANS FOR X-RAY TUBES
Filed March 2, 1939
5 Sheets-Sheet 1
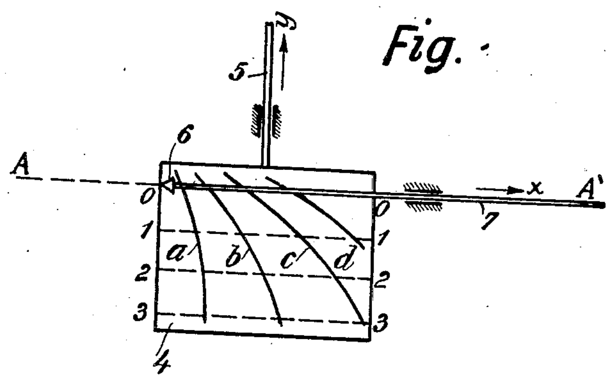
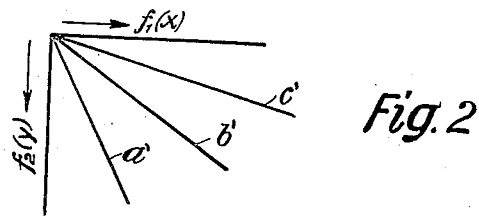
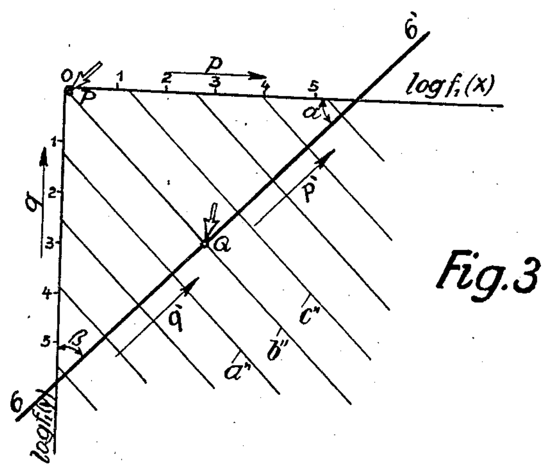
Karl Hefel
INVENTOR
By [signature]
his ATT'Y.

May 18, 1943. K. HEFEL 2,319,322
CONTROL MEANS FOR X-RAY TUBES
Filed March 2, 1939 5 Sheets-Sheet 2
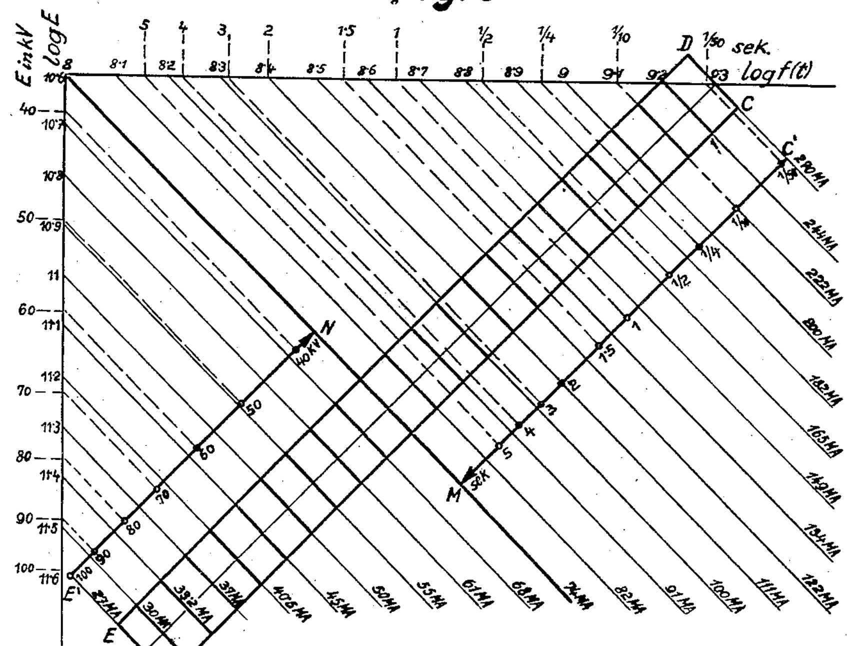
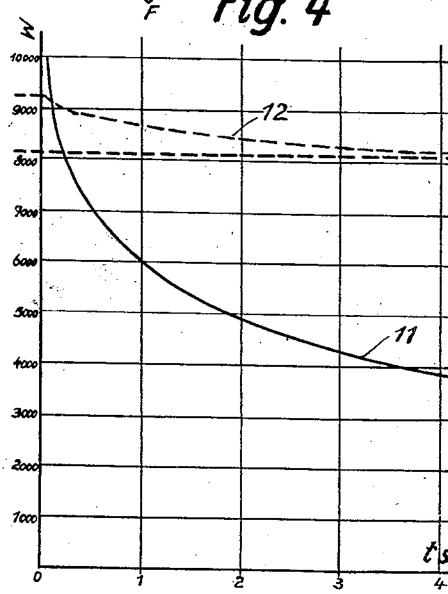
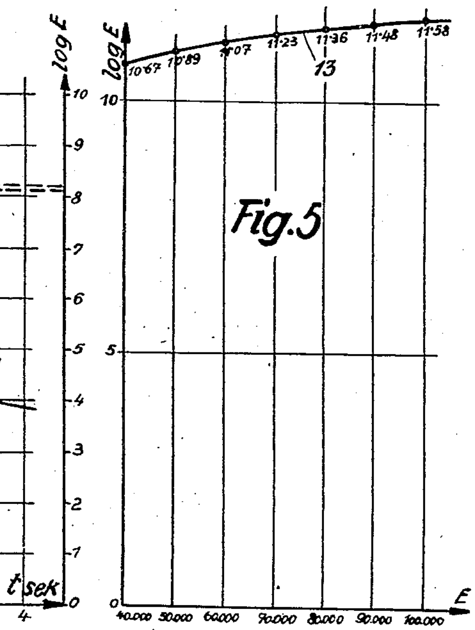
Karl Hefel
INVENTOR
By Otto Munk
his ATT'Y

CONTROL MEANS FOR X-RAY TUBES

Filed March 2, 1939 5 Sheets-Sheet 3

Karl Hefel
INVENTOR
By Otto Munk
his ATTY.

May 18, 1943 K. HEFEL 2,319,322
CONTROL MEANS FOR X-RAY TUBES
Filed March 2, 1939 5 Sheets-Sheet 4
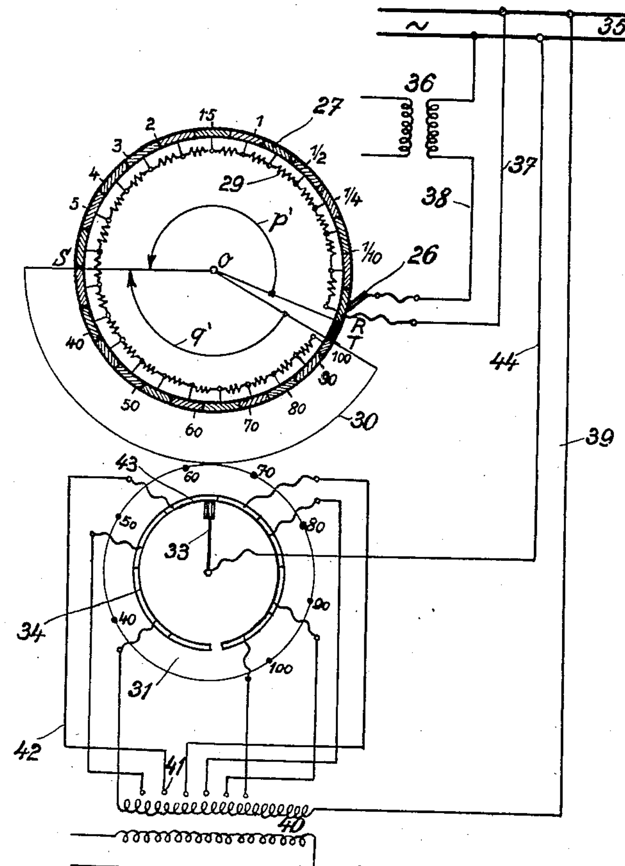
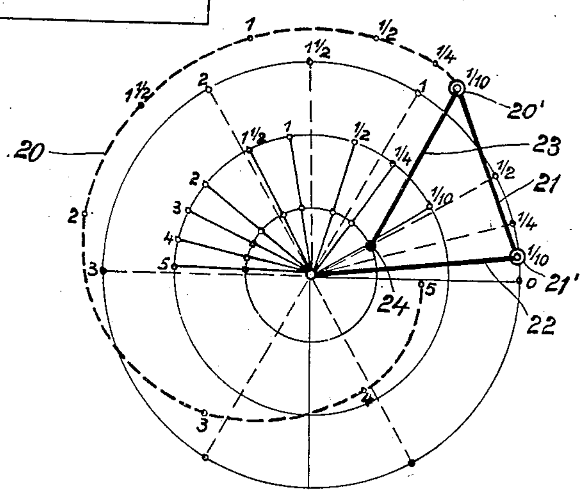
Karl Hefel
INVENTOR
By Otto Munk
his ATT'Y.

May 18, 1943
K. HEFEL
2,319,322
CONTROL MEANS FOR X-RAY TUBES
Filed March 2, 1939
5 Sheets-Sheet 5
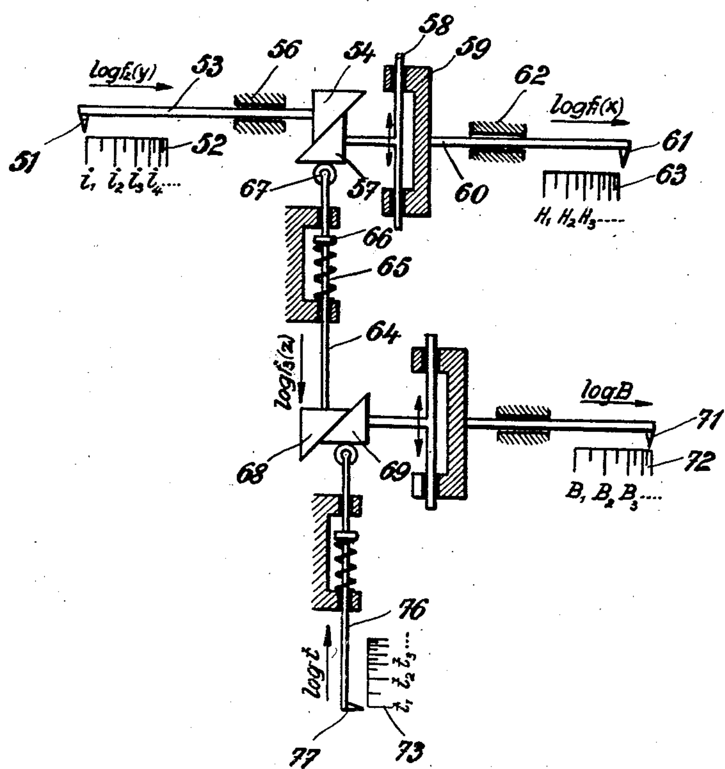
Karl Hefel
INVENTOR
By [signature]
ATT'Y.

Patented May 18, 1943

2,319,322

UNITED STATES PATENT OFFICE 2,319,322

CONTROL MEANS FOR X-RAY TUBES

Karl Hefel, Innsbruck, Germany; vested in the Alien Property Custodian

Application March 2, 1939, Serial No. 259,484
In Austria February 26, 1938

1 Claim. (Cl. 250—103)

The invention solves the problem of ascertaining by optical and mechanical means the third unknown variable $z$ from an equation having the form $$f_1(x)\,x f_3(z) = f_2(y)$$
(fundamental equation)

in which the quantities $x$ and $y$ are known variables, so that the quantity ($z$) can either be read or its value, especially when it is an electric value or one which can be ascertained by electric auxiliary apparatus, is set absolutely automatically. The apparatus according to the invention attains this in that a member (plate, cylinder or the like) is displaced (shifted, rotated) in one direction ($x$-axis) in dependency upon one of the known variables ($x$) and a second member (hand, contact or the like) in another direction ($y$-axis) in dependency upon the second known variable, the lines equal to the values of the third variable ($z$) to be visualized on one of the members for example the first mentioned. The value of the unknown variable is then indicated or set directly by the second mentioned member. The adjustment of the two movable members preferably takes place proportionally to the functions of the known variables ($f_1(x)$, $f_2(y)$), because then the lines of similar values of the third variable are represented as straight lines passing through the zero point of the coordinate system. If, moreover, the movable members are adjusted according to the logarithms of the functions of the known variables, the lines of values of the third variables, form parallel straight lines and it is possible, by projection of the two movements on to one and the same straight line to obtain a common direction of movement instead of two intersecting directions of movement of the adjustable members. Thus, the two-axis system is converted into a single-axis system which is excellently suitable in the form of a mechanical gear for solving the very large variety of problems set for the apparatus. For example it is possible, according to the invention, to ascertain purely mechanically and automatically the maximum permissible current load for an X-ray tube in this manner from the two quantities, load period and voltage of the tube, upon both of which quantities the maximum permissible current load is in functional dependency. By the same method adjustments among several variables can also be mechanically solved, by using the method several times successively. As an example the finding of the peak photographic conditions in the case of a photographic camera with the variable quantities, time of exposure, sensitivity of the photographic material, lighting of the object to be photographed and the size of stop, may be mentioned. Besides these uses the invention might be applied to a very many technical purposes for example in all instances where a quantity in functional dependency upon two or more changeable known variables is to be made apparent or to be automatically set.

Several embodiments of the invention are illustrated by way of example in the accompanying drawings, in which:

Figs. 1, 2 and 3 each show a diagram chart,

Figs. 4, 5 and 6 show three diagrams which serve as means for assisting in the construction of an apparatus for the automatic adjustment of the maximum permissible current load of an X-ray tube, Fig. 7 shows such an apparatus in elevation, Fig. 8 is a diagrammatic plan view of a part of Fig. 7, Fig. 9 shows the circuit arrangement of the apparatus, Fig. 10 is a diagrammatic view showing an apparatus for setting the peak photographic conditions for a photographic camera.

Fig. 1 shows a plate 4 which is adjusted by a rod 5 proportionally to the variable $y$. A hand 6, whose point is to be adjusted to a point on the plate which indicates the third variable $z$, is shifted by a rod 7 always on the line A—A′ proportionally to the variable $x$.

The numerals used as references are in italics and the numerals indicating the measurements are in small upright figures throughout the drawings.

In the fundamental equation given above a given value $y^0$ is taken as the known variable $y$. With this value $y^0$ the plate 4 stands so that the hand 6 moves exactly along the line 0—0 of the plate when the variable $x$ is changed. This means, that in this instance the function $f_2(y)$ must be regarded as a constant K, so that the equation $$f_1(x) \times f_3(z) = K$$

applies. Therefore to each value of the variable $x$ along the line 0—0 a value $z$ is coordinated, which can be imagined as inscribed on the plate 4. If the variable $y$ is now changed to the value $y_1$, the plate 4 moves so that the hand 6 moves along the line 1—1. To every value of the variable $x$ a given value of the variable $z$ is also coordinated on this line, and imagined as visible on the plate. If this procedure is continued for all values of the variable $y$ coming into question and the points of similar value of the unknown variable $z$ are connected curves $a$, $b$, $c$, $d$ and so forth are obtained. If these curves are ascertained at short distances apart, it is possible with the aid of these curves to read at the point of the hand 6 any value of the unknown variable $z$ which corresponds to a given value of the variable $y$ set on the plate 4 and to a given value of the variable $x$ set by the hand 6, according to the function given by the fundamental equation.

If this function has several roots for the variable $z$, several different values of the variable $z$ are coordinated to each point in the event of the variables $x$ and $y$ having given values. Then, a given number of groups of curves is obtained from which, however, it is generally only necessary to select one suitable curve group for solving the actual practical problem.

The curves $a$, $b$, $c$, $d$, and so forth can be divided into straight lines extending through the commencement of the coordinate system formed by the variables $x$ and $y$, if the two displacements along the $x$- and $y$-axes are not made proportional to the variables $x$ and $y$, but proportional to the functions $f_1(x)$ and $f_2(y)$ respectively. Then, the lines which connect the points of similar values of the variable $z$, are straight lines $a'$, $b'$, $c'$ and so forth which radiate from the commencement of the coordinate system and consequently a given value of the variable $z$ can be allotted to each of these straight lines (Fig. 2).

If the displacement along the $x$ and $y$ axes is also made proportional to the values $\log f_1(x)$ and $\log f_2(y)$ respectively the radiating straight lines of Fig. 2 divide up into parallel straight lines $a''$, $b''$, $c''$ and so forth according to Fig. 3. If at the same time the same scale is chosen for the values $\log f_1(x)$ and $f_2(y)$ the straight lines indicating the similar values of the variable $z$ are inclined at an angle of 45° to the two coordinate axes.

If the point of a hand is shifted from the point P (Fig. 3) in the direction of the arrow $p$ proportionally to the value $\log f_1(x)$ and at the same time the whole coordinate system is shifted in the direction of the arrow $q$ proportionally to the value $\log f_2(y)$, the hand indicates directly the actual value of the variable $z$. Instead of carrying out two displacements one perpendicularly to the other in the direction of the arrows $p$ and $q$, the two displacements may be projected on a straight line G—G' which is perpendicular to the lines $a''$, $b''$, $c''$. The two-axial coordinate systems then become a one-axial system. The hand is now shifted from the point Q, instead of from the point P, in the direction of the arrow $p'$ proportionally to the value $\log f_1(x) \cos \alpha$, whereas the imaginary straight line G—G' is shifted in the direction of the arrow $q'$ proportionally to the value $\log f_2(y) \cos \alpha$. The hand then indicates the actual value of the unknown variable $z$ directly on the straight line G—G'.

Although in the foregoing an indicating element and the optical ascertaining of the value of the third variable $z$ is referred to, the direct adjustment of a value can be effected, instead of a mere indication, in the same manner by means of an element substituted for the hand. This is particularly easy in the case of an electric value or a value which can be set by electric auxiliary devices such as relays. In this instance an electric contact is provided instead of the hand and slides on a contact plate, cylinder or the like.

*Example No. 1*

The maximum permissible current load of an X-ray tube is dependent upon the loading time $t$ and of the voltage E between anode and cathode. For various reasons it is desirable for the tube to operate as far as possible under the same maximum permissible current load. However, as long as the X-ray tube current J is not positively and automatically controlled in the correct manner by the voltage E and time $t$ it is not advisable to carry out this adjustment by hand because a single mistake may destroy the tube.

For this reason arrangements are known which combine the values of the tube voltage E, loading time $t$ and X-ray current J so that excessive loads are indicated or prevented. Mostly the tube voltage E and the product of milliamperes times seconds (quality and quantity) are first adjusted. Then, $t$ and J must be chosen so that the permissible load is not exceeded. However, constructions are known in which the tube voltage E and the time $t$ are adjusted, whereas the tube current J is influenced automatically by the time and voltage adjustments so that the tube is always loaded as much as possible but never overloaded. At the present time there exists no possibility of accurately adapting the X-ray current to the permissible load curve of the tube for all combinations of E and $t$. According to the present invention, however, the accurate adjustment of the X-ray current is easily possible for all pairs of values E and $t$ if the voltage E and the permissible watt load of the tube are taken as determining values for the adjustment, the latter being a clear function of the time $t$.

The maximum permissible tube watt load in dependency upon the loading time $t$ is indicated in Fig. 4 by the curve 11. On the other hand, the load is represented by the product of tube current J and tube voltage E, that is $$W = E \times J = f(t)$$

If this equation is compared with the fundamental equation it is:

$$f_1(x) = E$$
$$f_2(y) = f(t)$$
$$f_3(z) = J$$

If an arrangement similar to that illustrated in Fig. 3 is desired, the values $\log f(t)$ occur as abscissas. The curve 12 in Fig. 4 represents the function $\log W = \log f(t)$ which is obtained directly from the curve 11 in Fig. 4. The values log E are to be inscribed as ordinates. The values $t = 1/20$ to 5 seconds should come into question for example for the time adjustment, and a range $E = 40$ to 100 kv. for the voltage. The function $\log E = f(E)$ is illustrated in Fig. 5 by the curve 13. The abscissa must therefore cover a range of 8 to 9.28 and the ordinates a range of 10.6 to 11.58. The abscissa and coordinate are correspondingly inscribed in Fig. 6. The lines of the constant tube current J are then straight lines and inclined at an angle of 45° to the axes.

$$\text{Log J is } \log f(t) - \log E$$

Therefore, $$\text{Log } J_0 = 8 - 10.6 = -2.6$$

applies in the origin of the diagram drawn in Fig. 8.

Consequently, $$J_0 = e^{-2.6} = 0.074\ A = 74\ \text{MA}$$

In the same way the X-ray current J is calculated on all other lines of constant current strength J.

In ordinary X-ray tubes a corresponding heating current $i$ is clearly coordinated for every X-ray current J. Consequently, the lines for constant X-ray current J represent at the same time the lines of constant heating current $i$. If provision is made, that the correct heating current can be taken on the lines for constant X-ray current J, the maximum permissible load of the X-ray tube will be always automatically adjusted if the corresponding heating current is taken up by a brush which moves over the regulating strip CDEF in dependency upon the value log $t$ cos 45° in the direction of the arrow C'M, and at the same time the position of the strip CDEF is shifted in the direction of the arrow E'N proportionally to the value log E×cos 45°.

Fig. 7 shows a form of construction of such a regulating apparatus for an X-ray tube. 16 is an adjusting knob for the time. 17 is an adjusting knob for the voltage E. A time relay is first adjusted by the knob 16. As the time relay usually requires an adjustment proportional to the time $t$, the movement of the knob 16 must be converted into a logarithmic movement under the time relay. For this purpose a plate 19 is rigidly connected to the stationary casing of the time relay 18, and has a slot 20 in which a pin 20' of a lever 21 moves. A lever 22, hingedly connected to the lever 21 by an axle 21', is connected to the axle 35 of the time relay and consequently to the regulating knob 16. The lever 23 moves at the one end about the pin 20' and at the other end about the axle 24 mounted on a brush holder 25. By this lever transmission, the movement of the knob 16 proportional to the time can for example be converted into the necessary logarithmic movement of a brush 26 over a regulating strip 27 here arranged in a circle. At the same time the brush holder 25 is freely rotatable on a shaft 28, whereas the regulating strip and the resistance for regulating the heating current are coupled for rotation with the shaft 28. The shaft 28 is rotated by the knob 17 through the intermediary of an axle 32 and spur wheels 31 and 30. The axle 32 also carries a brush 33, which adjusts the voltage E on a contact ring 34. Normally it will not matter if the rotation of the knob 17 is made proportional to the value log E.

The construction of the guide slot 20 for the conversion of the rotations of the knob 16 proportional to the time $t$ into the rotation of the brush 26 proportional to the value log $t$ is shown for example in Fig. 8. The levers 21, 22 and 23 and the pivot points 21' and 24 correspond to the similarly designated levers and axes in Fig. 7. If the point 20' moves in the slot 20 of the plate 19 the corresponding conversion takes place.

Fig. 9 shows the corresponding wiring diagram. The regulating strip 27, bent in the form of a circle (corresponding to the strip CDEF of Fig. 6), is formed by plates insulated the one from the other. The brush 26 moves proportionally to the value log $t$×cos 45° over the plates from R to S. The whole regulating strip 27 with the resistances 29 located between the individual plates is rotated by means of the gear wheels 30, 31 in the direction of the arrow $q'$ from T to S proportionally to the value log $E$×cos 45°. The brush 33 rotates with the gear wheel 31 while the contact ring 34 is stationary.

35 is the electricity supply system. The heating current for the X-ray tube is adjusted by regulating the primary current of the heating transformer 36, this current flowing along wire 37 to the regulating strip 27 at R, thence through the resistances 29 to the plate over which the brush 26 is actually situated, then along wire 38 to the primary coil of the heating current transformer 36 and back to the system. The high voltage transformer 40 for producing the voltage E is connected to the system on one side by the wire 39 and on the other side by one of the tappings on the primary side, for example 41, the wire 42, contact segment 43, brush 33 and wire 44.

If the resistances 18 are correctly dimensioned such an arrangement adjusts automatically the highest permissible load for the X-ray tube for any selected exposure time $t$ and for any likewise chosen voltage E.

If the development of X-ray technics to-day prefer the adjustment of the mA sec product and the voltage E, the method described can also be adapted to this circumstance without any difficulty. As can be seen from Fig. 6 the displacement of the point C' in the direction towards M takes place proportionally to the log W, whereas the point E is displaced proportionally to the log E. However, the value log J can be easily derived mechanically from these two displacements in known manner according to the equation $\log J = \log W - \log E$. On the other hand, however, the value $t$ can be attained by the setting of the time relay. Consequently, the turning movement of the adjustment knob of the time relay by a separate rod system can be converted into a displacement proportional to the log $t$ for example with the aid of a curved guide. The log $(J \times t)$ can then be ascertained by mechanical means by the addition of log $t$ and the previously ascertained log J, that is one has a mechanically operating mA sec measuring instrument and can now adjust according to mA sec and E (quality and quantity) just as other known methods.

It may not always be desired to load the tube to maximum. In this case, the new service equation $W' = k \times f(t)$ is used instead of the service equation $W = f(t)$, $k$ being the fraction of the maximum load at which the tube is to be actuated. The new abscissa $\log W' = \log k + \log f(t)$, shown in Fig. 6 is now taken instead of the $\log W = \log f(t)$ that is the abscissa must be shifted in this instance by an amount log $k$, so that the same apparatus operates with the fraction $k$-times the maximum load. If for example care is taken that the brush 26 in Fig. 7 is shifted by log $k$ relatively to the position determined by the maximum load, the tube will now be operated with a fraction $k$-times the maximum load.

*Example No. 2*

The adjustment of the peak photographic conditions in the case of a photographic camera are hereinafter described with reference to Fig. 10 as an example of how adjustments among more than three variables can be solved mechanically by the apparatus according to the invention by applying the method several times successively.

It is known, that the exposure time $t$ is inversely proportional to the sensitivity $i$ of the photographic material, the brightness H of the object to be photographed and the size of stop B of the lens. If therefore, C represents a constant and it can be said that $$t = \frac{C}{HxBxi}$$

or $$C/i = H \times (B \times t) \text{ or } \log (C/i) = \log H + \log (B \times t)$$

In the sense of the fundamental equation therefore $$H = f_1(x)$$
$$C/i = f_2(y)$$
$$B \times t = f_3(z)$$

In the apparatus illustrated in Fig. 10 the arrangement is such that, at the adjustment of the hand 51 to the corresponding $i$-value on the scale 52, the rod 53 and therefore the equilateral and rightangle wedge 54 is displaced a distance equal to log C/$i$. The rod 53 is guided in the bearing 56. The wedge 57 is vertically shiftable in the guide 59 by means of the rod 58. The guide 59 itself is laterally shiftable in the bearing 62 by means of a rod 60. This arrangement is also such that, during the adjustment of the hand 61 to the corresponding H value on the scale 63, the wedge 57 is shifted laterally by the amount log H. As the two wedge surfaces sliding one on the other are at an incline of 45° relatively to the movement of the rods 53 and 60, a wedge 57 performs a movement perpendicularly thereto which is proportional to the value log $(B \times t)$, because this movement takes place in the value of $$\log\left(\frac{C}{i}\right) - \log\,(H)$$

and this formula, according to the above fundamental equation, is equal to the value log $(B \times t)$. This movement is transmitted to the wedge 57 by the roller 67 on the rod 64 which is pressed against the wedge 68 by the spring 65 and the disc 66 keyed on the rod 64.

In this apparatus the movement of the wedge 69 in the value log $(t)$ is derived from the movement of the wedge 68 in exactly the manner as that shown for this movement of the wedge 54, by the adjustment of the hand 71 on the scale 72 which corresponds to the values log B, by means of entirely similar transmission means in the sense of a mechanical subtraction. As the $t$-scale 75 is also logarithmically constructed, the hand controlled by the similar transmission means and mounted on the rod 76, is adjusted directly to the corresponding value of the exposure time $t$.

The movement of the hand 77 can act directly on the time adjusting device of the photographic camera, that of the hand 71 on the stop setting device and that of the hand 61 on the adjusting device of the brightness meter. If the sensitivity $i$ of the photographic material is then adjusted by the hand 51 and the brightness H of the object to be photographed is measured, for example by a brightness meter, whereby the rod 60 is brought into the corresponding position, either the size of stop B or the time $t$ can be chosen as desired; the other value is then correctly adjusted automatically. In the case of photographic cameras in which negative material of the same sensitivity is always used in practice (for example cinematic films), the variable $i$ is no longer present with the result that the apparatus is correspondingly simplified.

I claim:

A mechanism for regulating the output of X-ray tubes, comprising a control member to adjust the tube voltage, a control member to set the loading period, and a control device for the filament voltage including a number of ohmic resistances having different values and two cooperating contact elements, the first of said contact elements being a movable contact strip subdivided into a number of contact fields each adapted to complete the filament circuit through one of said resistances, the subdivision of said contact strip and the values of said resistances being chosen to cause an increase of the filament voltage along the strip in accordance with a logarithmic increase of the tube current produced by said filament voltage, the second contact element being a brush contact displaceable along said contact strip, said tube voltage control member being mechanically connected with one of said contact elements to displace the same in proportion to the tube voltage, and said loading period control member being mechanically connected with the other contact element to displace the latter in proportion to the logarithm of the highest watt load of the tube permissible for the selected loading period.

KARL HEFEL.